United States Patent
Nordback

(10) Patent No.: US 9,619,865 B2
(45) Date of Patent: Apr. 11, 2017

(54) RESOLUTION-INDEPENDENT DISPLAY LIST

(71) Applicant: Kurt N. Nordback, Boulder, CO (US)

(72) Inventor: Kurt N. Nordback, Boulder, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 608 days.

(21) Appl. No.: 13/621,700

(22) Filed: Sep. 17, 2012

(65) Prior Publication Data
US 2014/0082475 A1    Mar. 20, 2014

(51) Int. Cl.
*G06T 3/40* (2006.01)
*G06F 17/21* (2006.01)

(52) U.S. Cl.
CPC .......... *G06T 3/4092* (2013.01); *G06F 17/214* (2013.01)

(58) Field of Classification Search
CPC ..... G06T 11/203; G06T 11/00; G06T 3/4092; G06F 17/30905; G06F 17/00; G06F 17/214
See application file for complete search history.

(56) References Cited

U.S. PATENT DOCUMENTS

| | | | | |
|---|---|---|---|---|
| 6,466,229 B1* | 10/2002 | Nagao | ....................... | G06T 1/60 345/621 |
| 2002/0091738 A1* | 7/2002 | Rohrabaugh et al. | ........ | 707/517 |
| 2005/0146528 A1* | 7/2005 | Kotiranta | ....................... | 345/467 |
| 2009/0123075 A1* | 5/2009 | Yamazaki | ......... | G06F 17/30265 382/198 |
| 2009/0256852 A1* | 10/2009 | Sakurai et al. | ............... | 345/557 |
| 2012/0194539 A1* | 8/2012 | Zhang | ........................... | 345/590 |
| 2012/0206455 A1* | 8/2012 | Shreiner | .............. | G06T 15/005 345/420 |
| 2012/0236008 A1* | 9/2012 | Yamada | .................. | G06T 13/00 345/473 |

* cited by examiner

*Primary Examiner* — Kyle Stork
(74) *Attorney, Agent, or Firm* — Osha Liang LLP

(57) ABSTRACT

A method for scaling on a display device, including: obtaining an electronic document (ED) identifying multiple graphical features; generating, before receiving a request to scale the ED on the display device, multiple resolution-independent (RI) versions of the multiple graphical features; adding, before receiving the request to scale the ED on the display device, the multiple RI versions to a RI display list; receiving the request to scale the ED on the display device specifying a resolution; and generating, in response to the request, a scaled ED for the display device by rendering the multiple RI versions of the multiple graphical features in the RI display list at the resolution.

17 Claims, 4 Drawing Sheets

RESOLUTION-INDEPENDENT DISPLAY LIST

BACKGROUND

Computing devices are frequently used to display electronic documents (EDs). Moreover, computing devices often receive requests from users to zoom in to or zoom out from (i.e., scale) a displayed ED. However, scaling the ED is a non-trivial operation that consumes computing resources. In fact, scaling operations on computing devices utilizing low-powered hardware (e.g., mobile computing devices) have slow execution times that are observable by the users and interfere with the users' viewing experience. Regardless, users still wish to scale EDs on all types of computing devices.

SUMMARY

In general, in one aspect, the invention relates to a method for scaling on a display device. The method comprises: obtaining an electronic document (ED) identifying a plurality of graphical features; generating, before receiving a request to scale the ED on the display device, a plurality of resolution-independent (RI) versions of the plurality of graphical features; adding, before receiving the request to scale the ED on the display device, the plurality of RI versions to a RI display list; receiving the request to scale the ED on the display device, wherein the request specifies a resolution; and generating, in response to the request, a scaled ED for the display device by rendering the plurality of RI versions of the plurality of graphical features in the RI display list at the resolution.

In general, in one aspect, the invention relates to a non-transitory computer readable medium storing instructions for scaling. The instructions comprise functionality for: obtaining an electronic document (ED) identifying a plurality of graphical features; generating, before receiving a request to scale the ED on a display device, a plurality of resolution-independent (RI) versions of the plurality of graphical features; adding, before receiving the request to scale the ED on the display device, the plurality of RI versions to a RI display list; receiving the request to scale the ED on the display device, wherein the request specifies a resolution; and generating, in response to the request, a scaled ED for the display device by rendering the plurality of RI versions of the plurality of graphical features in the RI display list at the resolution.

In general, in one aspect, the invention relates to a system for scaling on a display device. The system comprises: a processor; a buffer storing an electronic document (ED) identifying a plurality of graphical features; a processing engine executing on the processor and configured to: generate, before receiving a request to scale the ED on the display device, a plurality of resolution-independent (RI) versions of the plurality of graphical features; and add, before receiving the request to scale the ED on the display device, the plurality of RI versions to a RI display device; and a rendering engine configured to: generate, after receiving the request, a scaled ED by rendering the plurality of RI versions of the plurality of graphical features in the RI display list at a resolution specified in the request.

Other aspects of the invention will be apparent from the following description and the appended claims.

DETAILED DESCRIPTION

Figure 1:
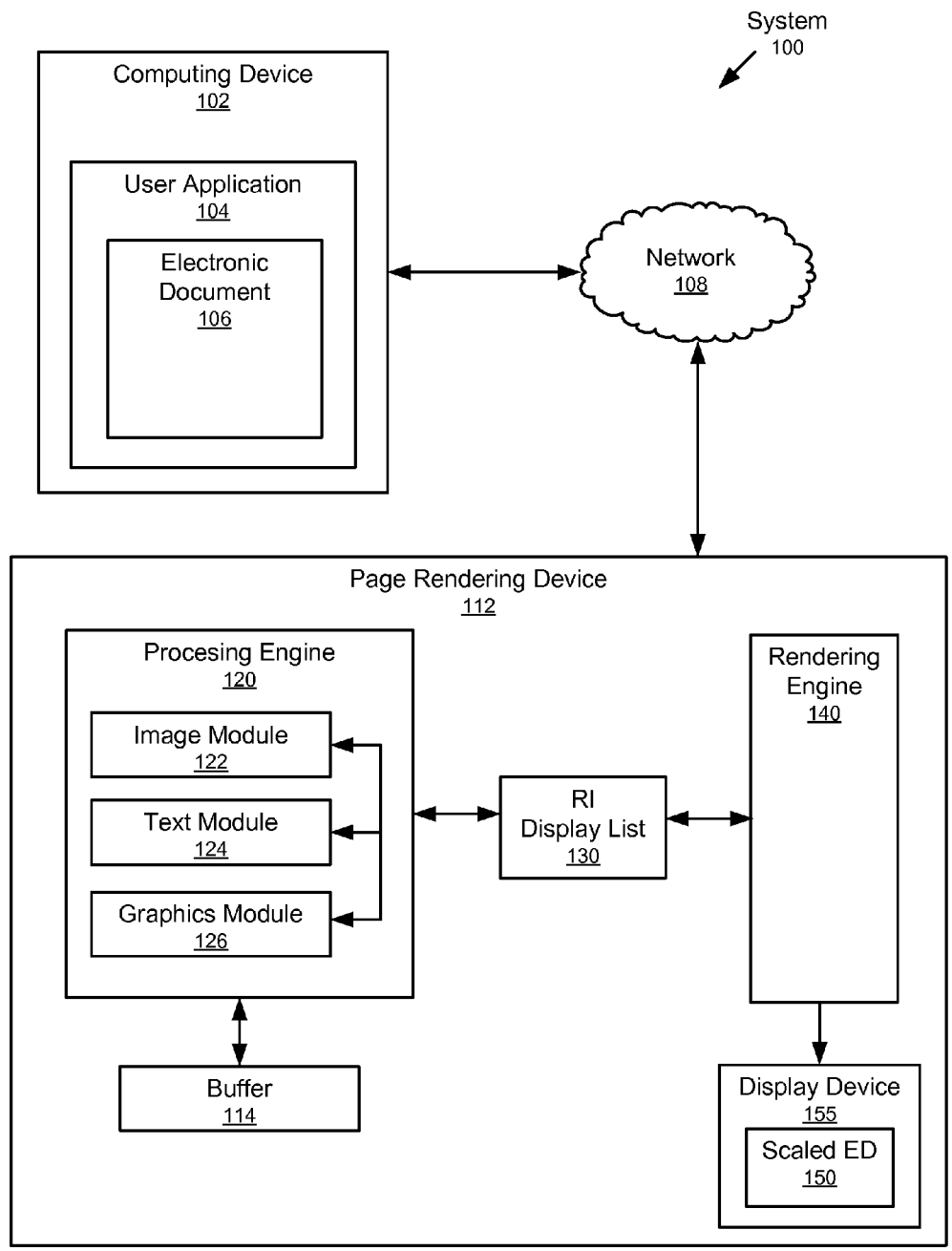
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for scaling an ED on a display device. The ED includes one or more graphical features (e.g., text characters, graphics, images, etc.). Prior to receiving a request to scale the ED on the display device, resolution-independent (RI) versions of the one or more graphical features are added to a RI display list. The RI display list is as fully processed as possible to minimize the final processing necessary to render its contents on the display device. For example, images are not scaled to the final display device resolution, but they are otherwise properly geometrically transformed for the device space, have been color-converted to the device color space, etc. As another example, graphics have been processed to generate elemental objects, such as triangles or trapezoids, which can be quickly scaled and discretized in device space. As yet another example, character data values have been extracted from one or more fonts in the ED, and outlines for text characters in the ED have been generated. The request to scale the ED on the display device specifies a resolution (i.e., a scale factor). A scaled ED is generated by rendering the RI versions of the one or more graphical features in the RI display list at the specified resolution.

FIG. 1 shows a system (100) in accordance with one or more embodiments of the invention. As shown in FIG. 1, the system (100) has multiple components including a page rendering device (PRD) (112) and a computing device (102). The PRD (112) and/or the computing device (102) may be a personal computer (PC), a desktop computer, a mainframe, a server, a telephone, a kiosk, a cable box, a personal digital assistant (PDA), an electronic reader, a mobile phone, a smart phone, a tablet computer, etc. The PRD (112) and/or the computing device (102) may include a display device (e.g., a monitor, screen, etc.) for displaying an ED (discussed below). In one or more embodiments of the invention, there exists a direct connection (e.g., universal serial bus (USB) connection) between the computing device (102) and the PRD (112). Alternatively, the computing device (102) and the PRD (112) may be connected using a network (108) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)). Accordingly, the user application (104) may be a word-processing application, a spreadsheet application, a desktop publishing application, a graphics application, a photograph printing application, an Internet browser, a slide show generating application, a form, etc. The user application (104) may generate new EDs and/or obtain previously saved EDs.

In one or more embodiments of the invention, the ED (106) includes one or more graphical features (e.g., text characters, images, graphics, etc.) to be displayed on or across one or more pages. In one or more embodiments of the invention, the ED (106) is represented/defined using a document markup language (e.g., open document format (ODF), office open XML (OOXML), etc.). Accordingly, the text characters, images, graphics, fonts, etc. in the ED (106) may be recorded/identified as attributes within the tags of the document markup language. Moreover, these graphical features (e.g., text characters, images, and graphics) are needed to correctly render the ED (106) for display or printing.

In one or more embodiments of the invention, the PRD (112) includes a buffer (114), a processing engine (120), a rendering engine (140), and a display device (155). As shown in FIG. 1, the processing engine (120) and the rendering engine (140) communicate using a RI display list (130). Each of these components (114, 120, 130, 140) is discussed below.

In one or more embodiments of the invention, the PRD (112) includes the buffer (114). The buffer (114) may correspond to any type of memory or long-term storage (e.g., hard drive). The buffer (114) is configured to store the ED (106) obtained by the PRD (112).

In one or more embodiments of the invention, the processing engine (120) has multiple components including an image module (122), a text module (124), and a graphics module (126). The processing engine (120) is configured to generate RI versions of the graphical features (e.g., text characters, graphics, images, etc.) in the ED (106) stored in the buffer (114). A RI version of a graphical feature is generated by performing the processing necessary to display the graphical feature on the display device (155), except for any processing that is dependent on the resolution to be specified in a scaling request. The RI display list (130) includes these RI versions of the graphical features (i.e., the RI versions are entries and/or elements in the display list (130)). Moreover, the RI display list (130) is generated before a request to scale the ED (106) is received.

In one or more embodiments of the invention, the processing engine (120) includes the image module (122). The image module (122) may be configured to generate RI versions of images in the ED (106) by properly geometrically transforming the images for the device space, other than a final scale factor, and/or converting the images to the color-space (e.g., red-blue-green (RGB) space, etc.) of the display device (155). The RI versions of the images may then be added to the RI display list (130).

In one or more embodiments of the invention, the processing engine (120) includes the text module (124). The text module (124) may be configured to generate RI versions of text characters in the ED (106) by extracting one or more character data values from fonts specified in the ED (106) and by generating vector outlines for the text characters, with the proper geometric transformations for the device space other than a final scale factor. The RI versions of text characters may then be added to the RI display list (130).

In one or more embodiments of the invention, the processing engine (120) includes the graphics module (126). The graphics module (126) may be configured to generate RI versions of graphics (e.g., clipart) in the ED (106) by generating elemental vector objects, such as triangles or trapezoids, from the graphics which can quickly be scaled and discretized at a future time (i.e., in response to a scaling request) in device space. The RI versions of the graphics may then be added to the RI display list (130).

As discussed above, the RI display list (130) is a communication mechanism between the processing engine (120) and the rendering engine (140). The rendering engine (140) is configured to generate a scaled ED (150) from the RI display list (130) and for display on the display device (155). In one or more embodiments of the invention, when a request to scale the ED (106) is received, the rendering engine (140) executes the RI display list (130) and scales the RI versions of graphical features identified within the RI display list (130). Specifically, the RI versions are scaled based on the resolution specified in the request. The resulting scaled ED (150) is displayed on the display device (155). Any number of scaling requests may be received and each time the rendering engine (140) generates the scaled ED (150) by starting with the existing RI display list (130) and scaling its RI entries/elements. In one or more embodiments of the invention, the rendering engine optimizes the rendering by ignoring any objects in the RI display list which do not intersect the display region. In one or more embodiments of the invention, the display device (155) is external to the PRD (112).

Figure 2:
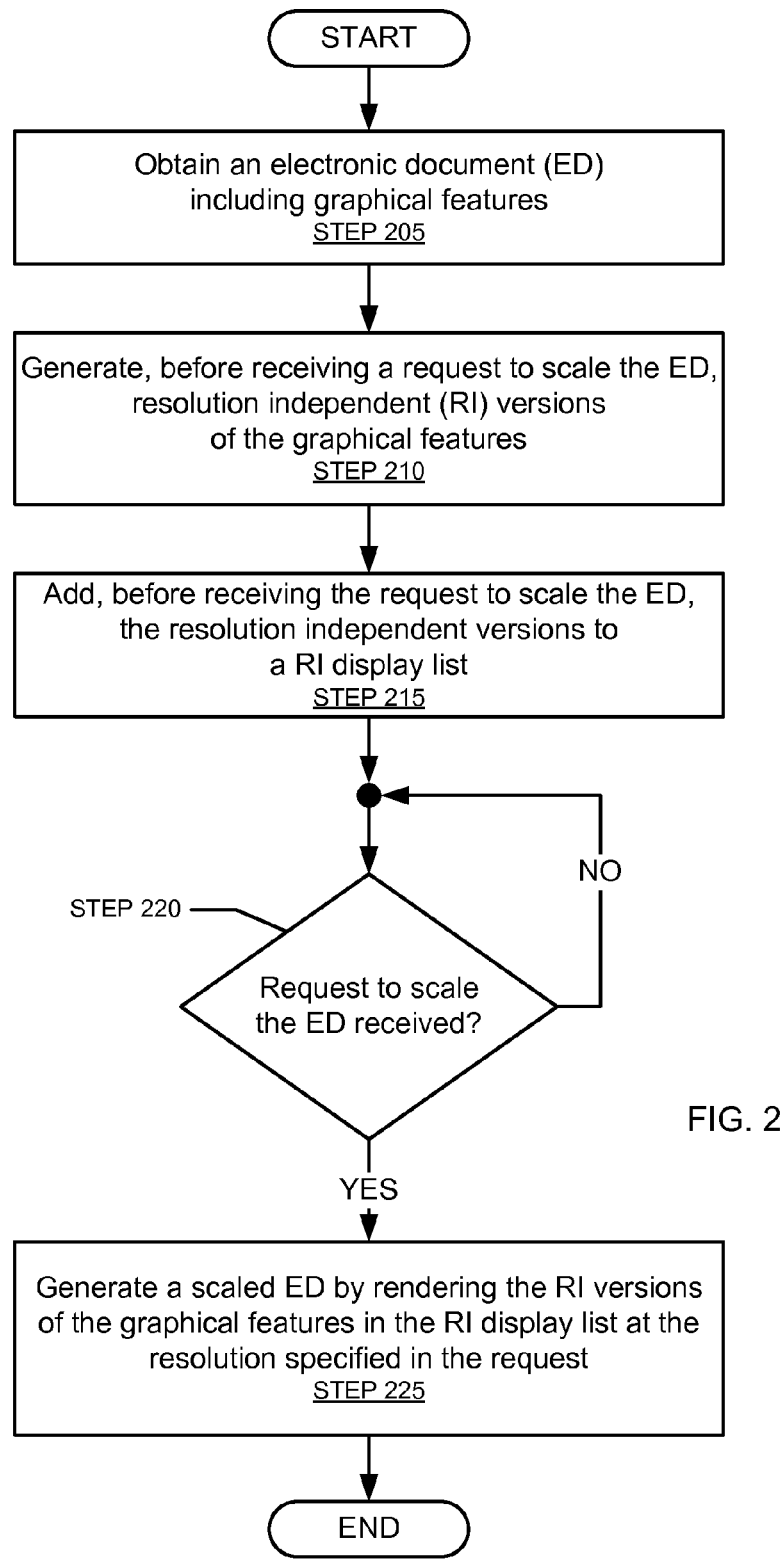
FIG. 2 shows a flowchart in accordance with one or more embodiments of the invention.

FIG. 2 shows a flowchart in accordance with one or more embodiments of the invention. The process shown in FIG. 2 may be executed, for example, by one or more components (e.g., processing engine (120), RI display list (130), rendering engine (140)) discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, an ED including one or more graphical features is obtained (STEP 205). The graphical features may include text characters, graphics (e.g., clipart), and/or images. As discussed above, the ED may be represented/defined using a page description language (e.g., Postscript, PDF, XPS, etc.) or using a document markup language (e.g., open document format (ODF), office open XML (OOXML), etc.). Accordingly, the text characters, images, and/or graphics in the ED may be recorded/identified page description language commands or as attributes within the tags of the document markup language.

In STEP 210, RI versions of the graphical features are generated. Specifically, these RI versions are generated before a request to scale the ED is received. As discussed above, a RI version of a graphical feature is generated by performing the processing necessary to display the graphical feature on a display device, except for any processing that is dependent on the resolution to be specified in a scaling request. For example, images are not scaled to the final display device resolution, but they are otherwise properly geometrically transformed for the device space, and are color-converted to the device color space, etc. As another example, graphics are processed to generate elemental objects, such as triangles or trapezoids, which can be quickly scaled and discretized in device space. As yet another example, character data values are extracted from one or more fonts in the ED, and vector outlines for text characters in the ED are generated.

In STEP 215, the RI versions of the graphical features are added to a RI display list. The RI display list is as fully processed as possible to minimize the final processing necessary to render its contents on the display device. Moreover, the RI display list exists prior to receiving a scaling request specifying a resolution.

In STEP 220, it is determined whether a request to scale the ED has been received (e.g., from a user). When it is determined that a request to scale the ED has been received, the process proceeds to STEP 225. When it is determined that a request to scale the ED has not arrived, the process continued to poll. In one or more embodiments of the invention, the request to scale the ED is received after the ED is already displayed to the user. In one or more embodiments of the invention, the request to scale the ED is received before the ED is displayed to the user.

In STEP 225, a scaled ED is generated by rendering the RI display list at the resolution specified in the scale request. Following execution of STEP 225, the process ends and the scaled ED is displayed on the display device.

Those skilled in the art, having the benefit of this detailed description, will appreciate that any number of scaling requests may be received after STEP 215 is executed and thus STEP 225 may be executed any number of times. However, in each case, the RI display list already exists and thus the scaled ED is generated by rendering the RI display list at the resolution specified in the instant scaling request.

Figure 3:
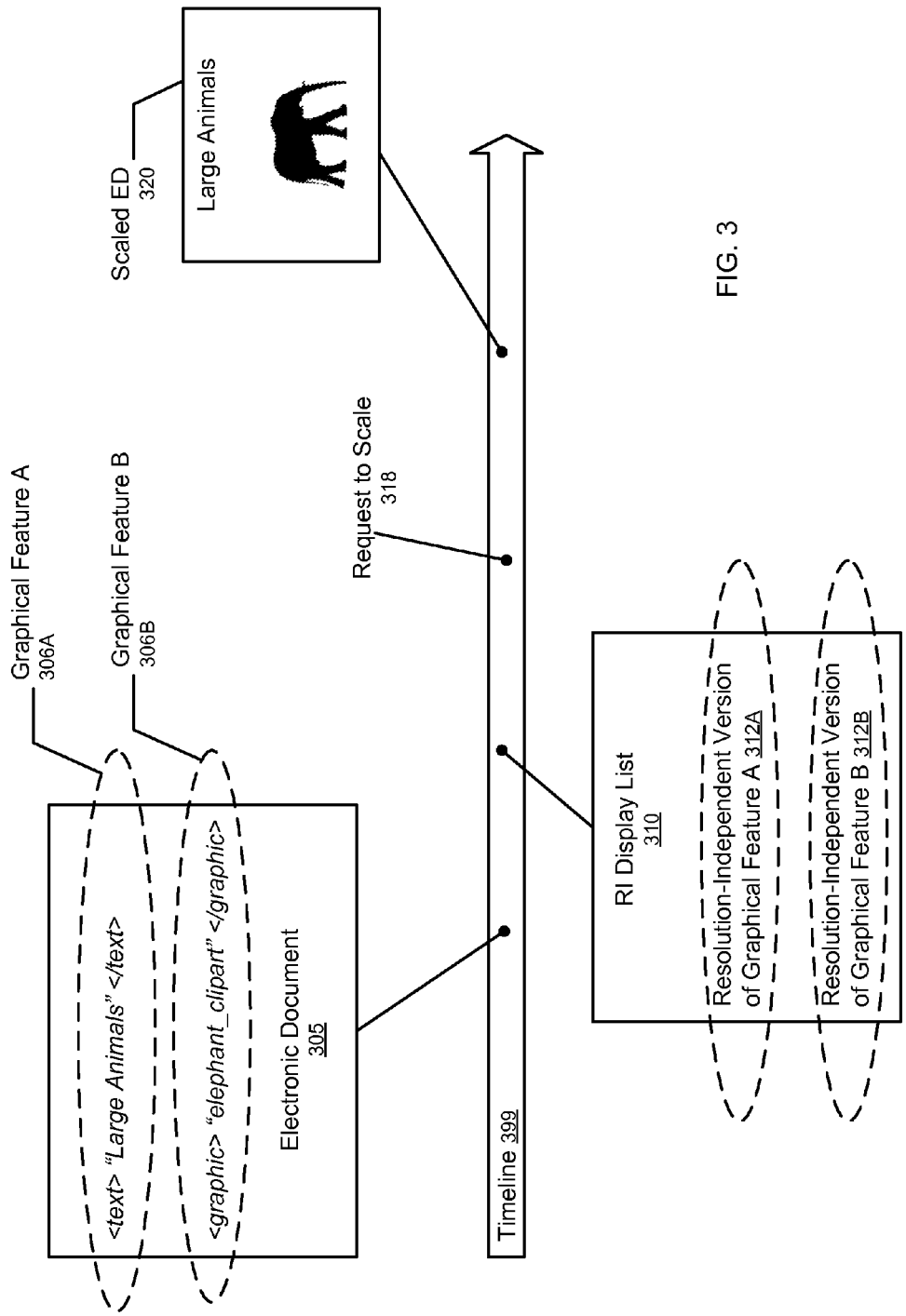
FIG. 3 shows an example in accordance with one or more embodiments of the invention.

FIG. 3 shows an example in accordance with one or more embodiments of the invention. As shown in FIG. 3, there exists an ED (305). The ED (305) has two graphical features: Graphical Feature A (306A) and Graphical Feature B (306B). Graphical Feature A (306A) corresponds to text characters. Graphical Feature B (306B) corresponds to a graphic (i.e., clipart).

Still referring to FIG. 3, a RI display list (310) is generated from the ED (305). The elements/entries of the RI display list (310) include the RI version of graphical feature A (312A) and the RI version of graphical feature B (312B). The RI version of graphical feature A (312A) may correspond to vector outlines of the text characters generated from character data extracted from the font(s) specified in the ED (305). The RI version of graphical feature B (312B) may correspond to elemental objects representing the graphic.

As shown by the timeline (399) in FIG. 3, a request to scale (318) is received after the RI display list (310) exists. The request to scale is generated by a user and specifies a resolution. In response to the request to scale (318), the RI display list (310) is executed and the elements/entries (i.e., 312A, 312B) in the display list (310) are scaled based on the resolution specified in the request. The resulting scaled ED (320) is displayed. The scaled ED (320) includes the graphical features (306A, 306B) in their scaled (i.e., resolution specific) sizes.

Embodiments of the invention may have one or more of the following advantages: the ability to quickly scale EDs; the ability to quickly scale EDs while maintaining high rendered quality; the ability to eliminate extraneous processing when rendering at a given scale and thus not overburden low-powered hardware; the ability to improve the experience of a user viewing and scaling the ED; etc.

Figure 4:
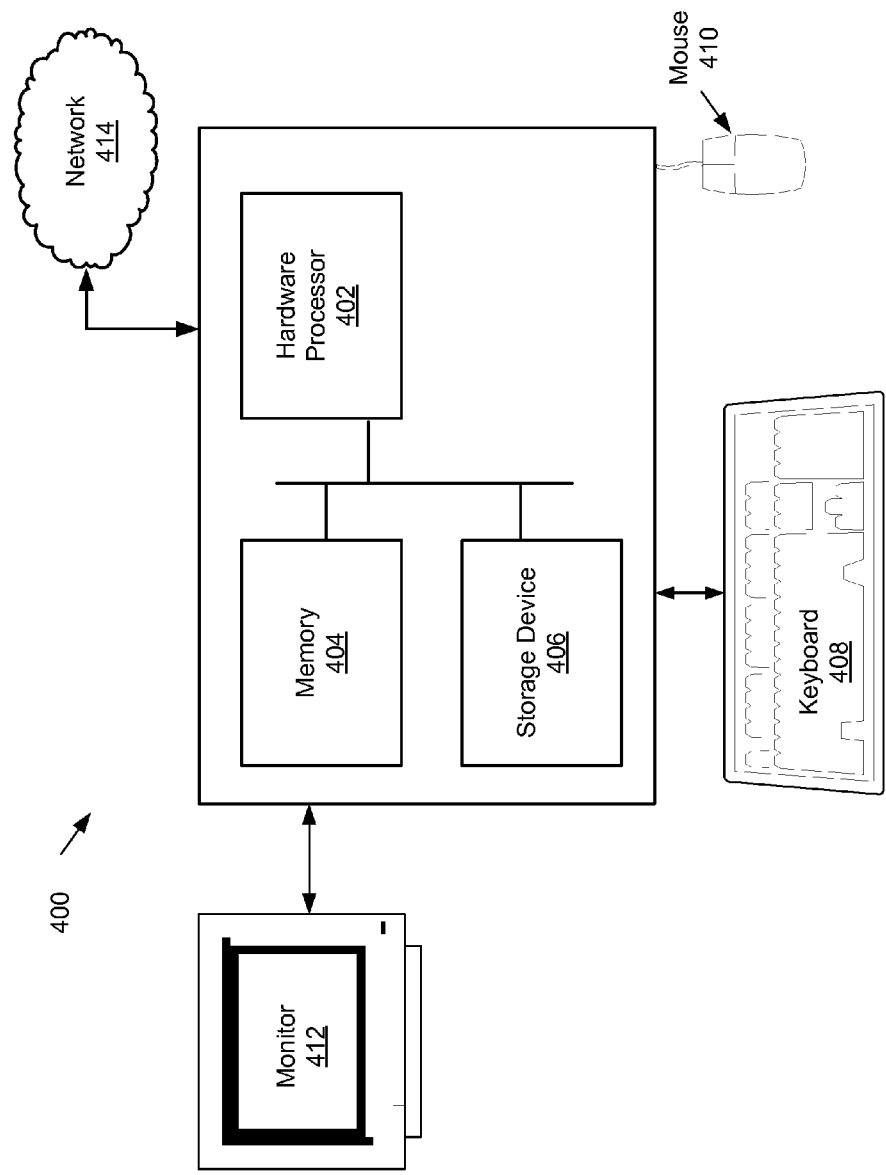
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), an associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. the computing device, the multifunction printer) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scaling on a display device, comprising:
    obtaining an electronic document (ED) identifying a plurality of graphical features comprising a graphic and a text character, wherein the graphic and the text character are different;
    generating, before receiving a request to scale the ED on the display device, a plurality of resolution-independent (RI) versions of the plurality of graphical features by converting the graphic into a plurality of elemental vector objects and generating a vector outline for the text character,
    wherein generating the plurality of RI versions is performed by a page rendering device (PRD) comprising the display device, and wherein the PRD is at least one selected from a group consisting of a personal computer and a mobile computing device;

adding, before receiving the request to scale the ED on the display device, the plurality of RI versions comprising the plurality of elemental vector objects and the vector outline to a RI display list;

receiving the request to scale the ED on the display device, wherein the request specifies a resolution; and rendering, in response to the request, a scaled ED for the display device by executing the RI display list comprising the plurality of RI versions of the plurality of graphical features based on the resolution, wherein the text character is visible in the displayed scaled ED.

2. The method of claim 1, wherein the ED is described in OOXML.

3. The method of claim 1, wherein the plurality of elemental vector objects comprises at least one selected from a group consisting of a triangle and a trapezoid.

4. The method of claim 1, wherein generating the plurality of RI versions further comprises:

converting an image to a color space of the display device, wherein the plurality of graphical features comprises the image.

5. The method of claim 4, wherein the color space of the device is red, blue, green.

6. The method of claim 1, wherein:

adding the plurality of RI versions to the RI display list is performed by the PRD; and rendering the scaled ED is performed by the PRD.

7. A non-transitory computer readable medium (CRM) storing instructions for scaling, the instructions comprising functionality for:

obtaining an electronic document (ED) identifying a plurality of graphical features comprising a graphic and a text character, wherein the graphic and the text character are different;

generating, before receiving a request to scale the ED on a display device, a plurality of resolution-independent (RI) versions of the plurality of graphical features by converting the graphic into a plurality of elemental vector objects and generating a vector outline for the text character, wherein generating the plurality of RI versions is performed by a page rendering device (PRD) comprising the display device, and wherein the PRD is at least one selected from a group consisting of a personal computer and a mobile computing device;

adding, before receiving the request to scale the ED on the display device, the plurality of RI versions comprising the plurality of elemental vector objects and the vector outline to a RI display list;

receiving the request to scale the ED on the display device, wherein the request specifies a resolution; and rendering, in response to the request, a scaled ED for the display device by executing the RI display list comprising the plurality of RI versions of the plurality of graphical features based on the resolution, wherein the text character is visible in the displayed scaled ED.

8. The non-transitory CRM of claim 7, wherein the ED is described in OOXML.

9. The non-transitory CRM of claim 7, wherein the plurality of elemental vector objects comprises at least one selected from a group consisting of a triangle and a trapezoid.

10. The non-transitory CRM of claim 7, wherein the instructions for generating the plurality of RI versions further comprise functionality for:

converting an image to a color space of the display device, wherein the plurality of graphical features comprises the image.

11. The non-transitory CRM of claim 10, wherein the color space of the device is red, blue, green.

12. The non-transitory CRM of claim 7, wherein:

adding the plurality of RI versions to the RI display list is performed by the PRD; and rendering the scaled ED is performed by the PRD.

13. A system for scaling on a display device, comprising:

a processor;

a buffer storing an electronic document (ED) identifying a plurality of graphical features comprising a graphic and a text character, wherein the graphic and the text character are different;

a processing engine executing on the processor and that:

generates, before receiving a request to scale the ED on the display device, a plurality of resolution-independent (RI) versions of the plurality of graphical features by converting the graphic into a plurality of elemental vector objects and generating a vector outline for the text character; and adds, before receiving the request to scale the ED on the display device, the plurality of RI versions comprising the plurality of elemental vector objects and the vector outline to a RI display list, wherein the processing engine is located on a page rendering device (PRD) comprising the display device, and wherein the PRD is at least one selected from a group consisting of a personal computer and a mobile computing device; and a rendering engine that:

renders, after receiving the request, a scaled ED by executing the RI display list comprising the plurality of RI versions of the plurality of graphical features based on a resolution specified in the request, wherein the text character is visible in the displayed scaled ED.

14. The system of claim 13, wherein the ED is described in OOXML.

15. The system of claim 13, wherein the plurality of elemental vector objects comprises at least one selected from a group consisting of a triangle and a trapezoid.

16. The system of claim 13, wherein the processing engine comprises:

an image module that converts an image to a color space of the display device, wherein the plurality of graphical features comprises the image.

17. The system of claim 13, wherein the rendering engine is located on the PRD comprising the display device.

* * * * *